3,095,068
ACTUATOR SELF-ADJUSTING AS TO RANGE
Quinten A. Hansen, Franksville, Wis., assignor to R. H. Stearns and R. N. Stearns, Milwaukee, Wis.
Filed Aug. 23, 1960, Ser. No. 51,437
13 Claims. (Cl. 188—171)

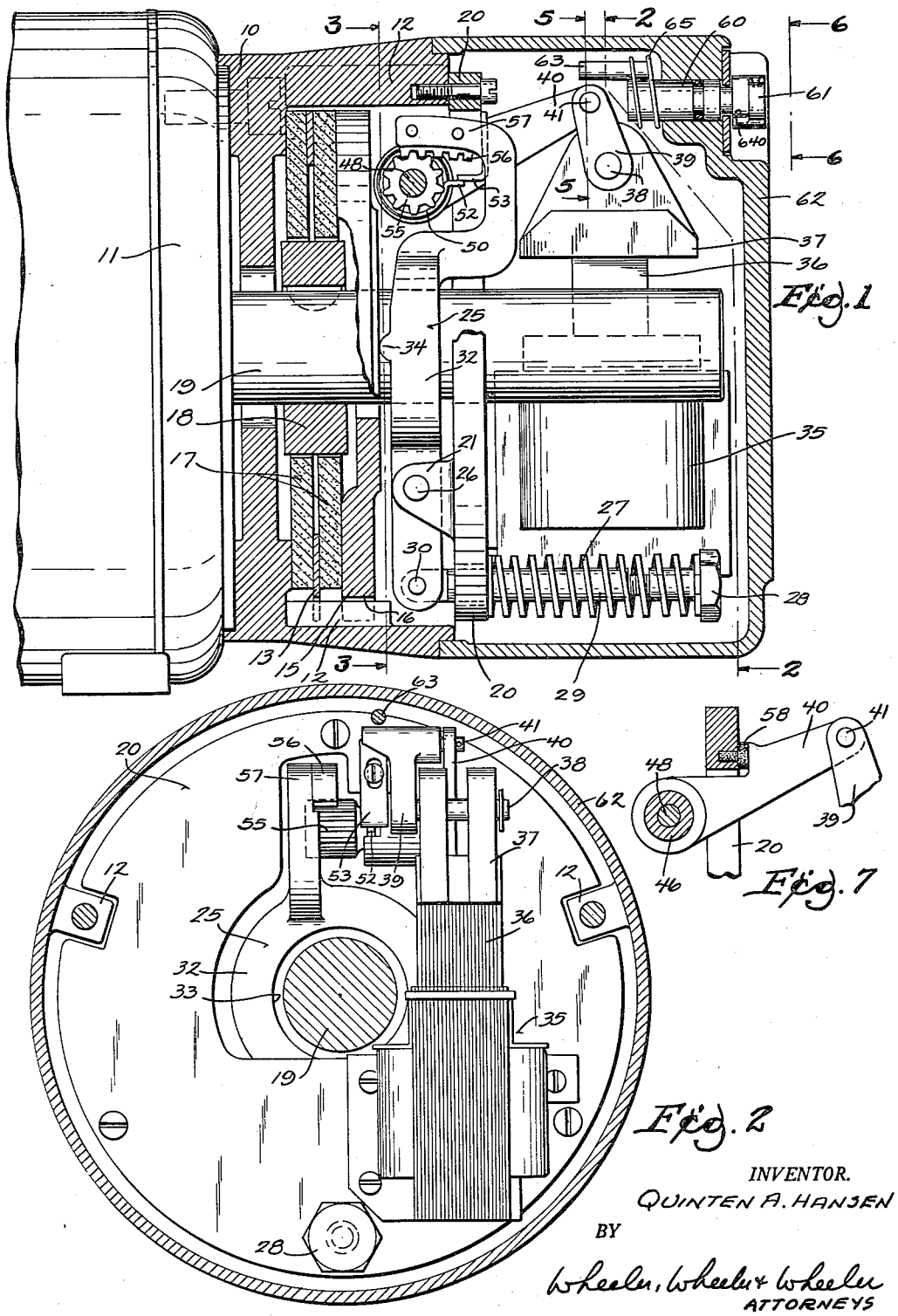

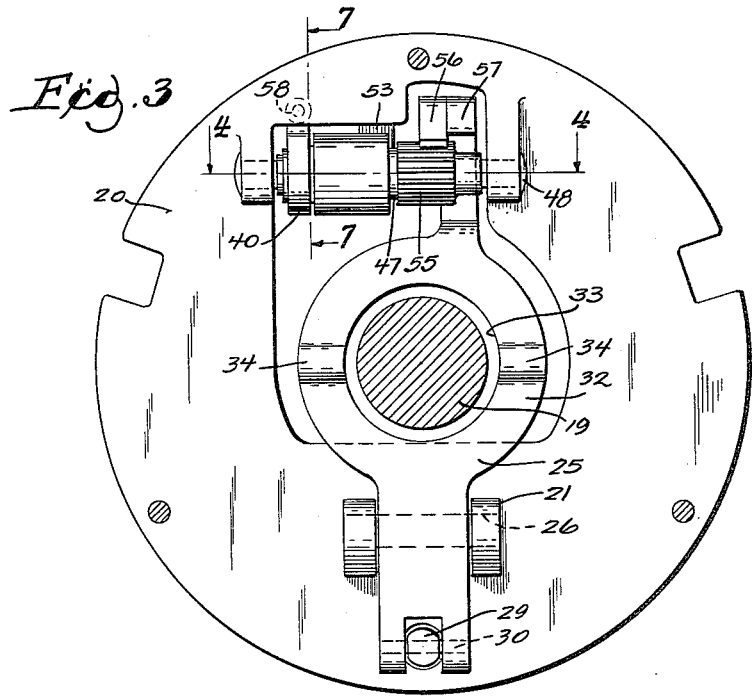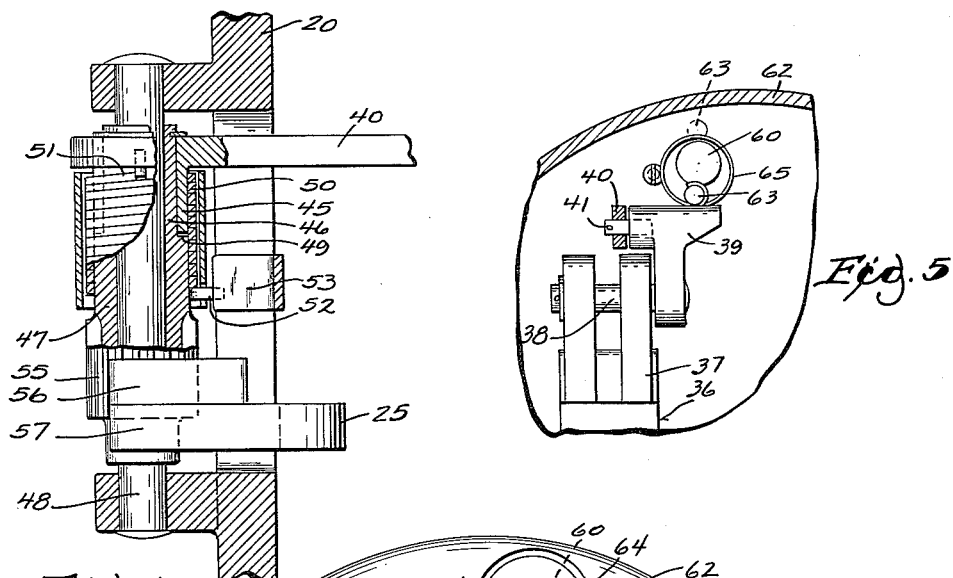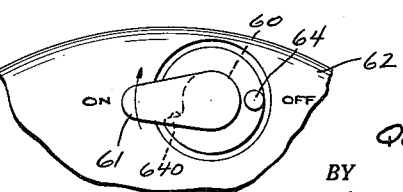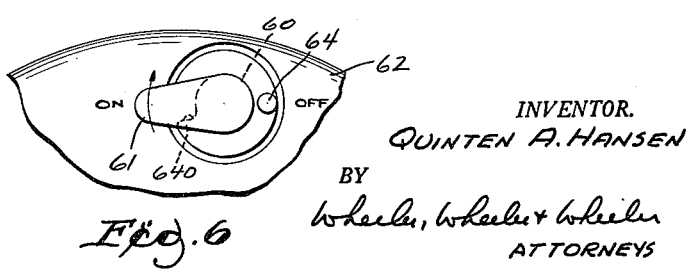
INVENTOR.
QUINTEN A. HANSEN
BY
Wheeler, Wheeler & Wheeler
ATTORNEYS June 25, 1963  Q. A. HANSEN  3,095,068
ACTUATOR SELF-ADJUSTING AS TO RANGE
Filed Aug. 23, 1960  3 Sheets-Sheet 3
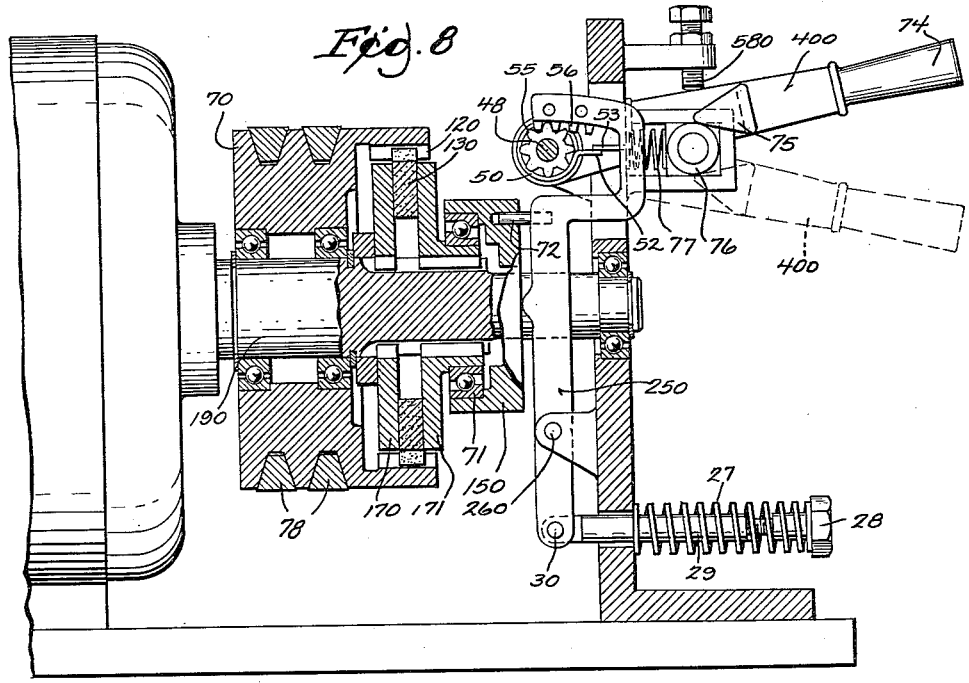
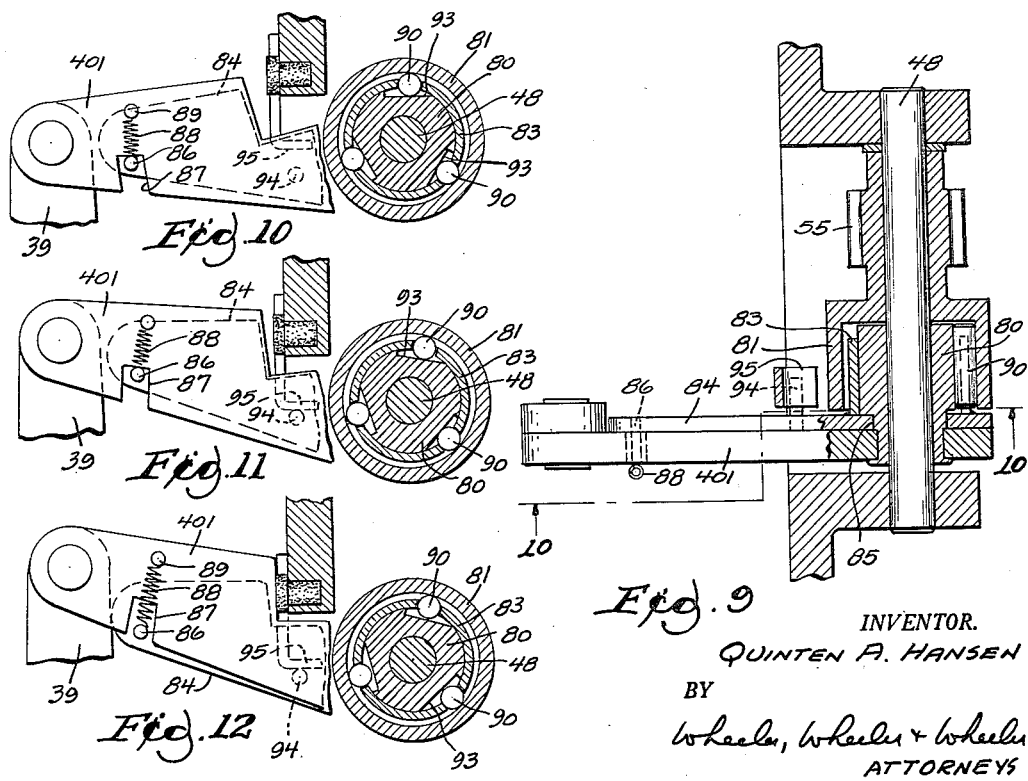
INVENTOR.
QUINTEN A. HANSEN
BY
Wheeler, Wheeler & Wheeler
ATTORNEYS United States Patent Office 3,095,068
Patented June 25, 1963

This invention relates to an actuator which is self-adjusting to compensate for wear or other changes in the actuating mechanism.

Generically, the self-compensating connection provided by the present invention provides a coupling between a driving operator of fixed range and a driven member of variable range to effect substantially uniform displacement of the driven member in each operation regardless of variation in range.

The invention has particular utility in a clutch or brake operating mechanism where it compensates for wear or swelling of the lining. Although there are other fields of utility, the invention will be described from the standpoint of the disclosed embodiments in which the self-adjusting feature is incorporated in the operating mechanism for an automatic brake or an automatic clutch. The brake is of the self-applying electromagnetically releasable type disclosed in my former Patent 2,939,551 of June 7, 1960. In the device of said patent, and other similar brakes, it was necessary to adjust the device manually to compensate for changes in thickness of the brake disks or lining. In the use of the device of the present invention, such compensation is made automatically.

The automatic adjustment feature involves transmission of motion through aligned rotors, one of which is connected to the other with an overrunning clutch. In one preferred embodiment herein disclosed, one of the aligned rotors is encircled by a clutch spring connected with the other. The free end of the spring, which is wrapped around the rotor with which it has no positive connection, will normally maintain clutching engagement unless the range of oscillation of the last mentioned rotor exceeds a predetermined maximum. If any such excess occurs, the free end of the spring will strike a fixed stop in a direction tending to unwrap the spring and thereby release its clutching engagement with the last mentioned rotor. The resulting relative movement will restore the parts to the normal operating range, the spring re-establishing its clutching connection when the rotor moves in a direction to release its free end from engagement with the stop.

A stop is also provided in the path of oscillation of the rotor with which the spring has positive connection. This stop is engaged if the desired range of movement is exceeded in the other direction from that which unclutches the spring. The abrupt stopping of the rotor with which the clutch spring has positive connection will not be followed by an equally abrupt stopping of the other rotor with which the spring has clutching connection. The momentum of the other rotor will act on the spring in a direction to relax its grip slightly, thereby permitting relative movement between the rotors in a direction to restore them to the desired relative range of movement.

As applied to a brake mechanism in which the self-adjusting operator is installed for the purposes of the present exemplification, the relative movement between the spring-clutched rotors which results when the projecting end of the spring strikes a stop will compensate for wear, while the self-adjustment which occurs as the result of impact of the rotor with which the spring is positively connected will compensate for swelling.

In the foregoing description, it is assumed that the operating mechanism is being oscillated forth and back by the brake applying spring in one direction and in the other direction by the solenoid which releases the brake. The device is also self-adjusting even if the solenoid fails to act and the oscillating parts are continuously subject to torque developed by the brake applying spring. In such a case, wear will ultimately result in movement of the spring-clutch-coupled parts to a position in which the free end of the spring strikes the fixed stop above referred to. Any further movement will relax the wrap of the spring to allow the part wrapped thereby to rotate within the spring, thus compensating for wear.

In the drawings:

FIG. 1 is a view taken in section axially of the brake housing, portions of the mechanism being broken away.

FIG. 2 is a view taken in section on the line 2—2 of FIG. 1.

FIG. 3 is a view of the mounting plate and mechanism from the viewpoint indicated at 3—3 in FIG. 1, the housing being omitted.

FIG. 4 is an enlarged detail view taken in section on the line 4—4 of FIG. 3, portions being broken away.

FIG. 5 is an enlarged detail view taken in section on the line 5—5 of FIG. 1.

FIG. 6 is an exterior view in elevation taken from the viewpoint 6—6 in FIG. 1.

FIG. 7 is a fragmentary detail view taken on the line 7—7 of FIG. 3.

FIG. 8 is a view comparable to FIG. 1 showing a modified embodiment incorporating several individually usable features.

FIG. 9 is a view comparable to FIG. 4 showing a modified embodiment using a roller type clutch in place of the spring type clutch previously shown.

FIG. 10 is a view taken in section on the line 10—10 of FIG. 9.

FIGS. 11 and 12 are views similar to FIG. 10 showing the parts in different operating positions.

In general, the brake and clutch shown are conventional. In the brake shown in FIGS. 1 to 7, a mounting ring 10 is applied to the end of the motor shell 11. It is provided internally with ribs 12 with which notches 16 of the brake disk 13 and brake pressure plate 15 are slideably and non-rotatably engaged as shown in the lower part of FIG. 1.

The intervening disk or disks 17, which are usually flexible, and frequently made of brake-lining material, are mounted on a squared block 18 keyed to the motor armature shaft 19.

Such a brake is conventionally applied by spring pressure and is released by a solenoid which is energized concurrently with the electric motor upon whose armature the brake acts. In the instant device, a mounting plate 20 is bolted to the ring 10 and is provided with ears 21 to which the operating lever 25 is pivoted by pintle 26. A compression spring 27 seated against the lower end of plate 20 as shown in FIG. 1, engages a spring seat 28 in screwthreaded connection with a link 29 pivotally connected at 30 to the lower end of lever 25. The link extends through mounting plate 20 and tends to oscillate the lever counterclockwise as viewed in FIG. 1.

The lever has an intermediate annular portion 32 which has an opening at 33 through which the armature shaft 19 may project if the shaft is long. Substantially on the transverse diameter of the shaft, the annular portion 32 of lever 25 is provided with ribs 34 which bear against compression plate 15 of the brake in a brake applying direction.

For releasing the brake when the motor is energized, a solenoid magnet 35 is provided. This conventionally has electrical connections (not shown) to be energized concurrently with the motor. When the solenoid is energized, it draws armature 36 downwardly. The armature head 37 has a pintle 38 upon which link 39 is pivoted. The link is pivotally connected to rocker arm 40 by pivot bolt 41, whereby the downward movement of the armature oscillates the tubular rotor 45 which provides a bearing hub for rocker arm 40 (FIG. 4). In the particular device shown, the rotor 45 is mounted for oscillation upon a reduced end portion 46 of rotor 47. Rotor 47 is mounted for oscillation on a fixed bar 48 carried by the mounting plate 20. The rotor 45 abuts a shoulder 49 beyond which the diameter of rotor 47 is substantially identical with that of rotor 45. The two rotors are encircled by a clutch spring 50 having one end portion 51 fixed to rotor 45 by engagement with the lever 40 for which rotor 45 constitutes a hub. The other end portion 52 of clutch spring 50 projects radially as shown in FIG. 1 and FIG. 4. At one extreme of the range of oscillation of the parts, the projecting extremity 52 of clutch spring 50 may engage a fixed stop 53 to relax the grip of clutch spring 50 upon the cylindrical surface of rotor 47 with which the spring is normally contractilely engaged.

The purpose and the operation will be described below.

The rotor 47 carries a pinion 55 which may be integral therewith. The pinion meshes with an internal gear segment 56 mounted on the upper end portion 57 of the brake operating lever 25. When the brake operating lever is actuated by its spring 27 in a brake applying direction, its mesh with pinion 55 tends to oscillate the pinion 55 and the rotor 47 counterclockwise as viewed in FIG. 1. Friction between the rotor and the portion of clutch spring 50 proximate its free end will tend to tighten the wrap of the spring upon the rotor. However, if the projecting free end 52 of the clutch spring engages the fixed stop 53, the wrap of the spring 50 upon rotor 47 will be relaxed to accommodate continued counterclockwise rotation of the rotor independently of the clutch spring and of the rotor 45 with which the other end of the spring has fixed connection.

When the solenoid 35 is energized, the armature 36 will be attracted with sufficient force to rotate lever 25 in a clockwise direction as viewed in FIG. 1, thereby releasing pressure on the brake disks. This motion will be transmitted through link 39 and lever 40 to the rotor 45 which forms the hub of lever 40 and about which a portion of the clutch spring 50 is wound and with which the wound portion of the spring is in terminal fixed connection through the lever 40. In this direction of movement, friction between the spring and the respective rotors also tends to increase the wrapping pressure, whereby the clutch spring 50 is self-activating. Its movement with the rotors is now in a direction such that the projecting end portion 52 of the spring is moved away from the stop 53.

However, when the solenoid magnet 35 is de-energized and the spring 27 acts to return the parts to their original positions, thus re-engaging the brake, the lever 40 will move up sharply in a counterclockwise direction until lever 40 strikes a stop 58 with which the mounting plate 20 is provided as shown in FIG. 7. When this happens, the continued momentum-movement of rotor 47, with rotor 45 at rest, will relax the free end of the clutch spring 50 but the spring will re-engage when the motion of the brake applying lever 25 ceases in consequence of the seating engagement of the several brake disks. Thus the two rotors will automatically find a new angular relationship which will be such that the brake plates will normally engage to arrest rotor movement before the armature-actuated lever 40 strikes abutment 58 upon de-energization of the armature.

Detent means is provided for holding the brake disengaged to permit work upon the motor or the parts driven by motor armature shaft 19. Desirably the detent means is such that it will automatically release itself whenever the motor is energized to energize the solenoid 35. Thus, without attention of the operator, a brake manually disengaged for any purpose will automatically be returned to service.

The detent comprises a rock shaft 60 capable of about 180° of oscillation and having a hand lever 61 on the outside of the shell 62 which encloses the mechanism. The rock shaft 60 is provided with an off-center camming pin 63 shown in FIGS. 1 and 5. This pin is arranged to operate on the link 39 to depress lever 40 and armature 36 against the bias of brake spring 27. This operation will mechanically effect the release of the armature shaft 19.

The helical spring 65 biases the detent rock shaft 60 for rotation counterclockwise from the full line position of FIG. 5 to the dotted line position in that view. In the "off" position in which the pin 63 is shown in full lines in FIG. 5, it is just past dead center and is therefore held against return to its "on" position by the bias of spring 27. The detent position shown in FIG. 5 is defined by a stop 64 engaged by a shoulder 640 of handle 61 (FIG. 6). Thus the detent will hold the brake disengaged as long as desired. However, if the solenoid is energized, it will draw the armature 36 downwardly against the bias of spring 27 somewhat farther than the position in which the armature is held by the detent. Accordingly, the detent pin 63 will be relieved of pressure of link 39 and its biasing spring 65 will thereupon rotate the detent back in a counterclockwise direction as viewed in FIG. 5 and FIG. 6, thus permitting the parts to resume normal functioning.

The operation of the spring clutch as a means of automatically controlling the adjustment of the parts has already been indicated but will be summarized.

The rotors connected by the clutch are operated in one direction by the spring 27 and in the other direction by the solenoid. There are two principal conditions in which the clutch permits automatic self-adjustment between the actuating mechanism and the brake applying mechanism, the respective rotors being connected with the respective mechanisms.

The first situation is one in which wear in the brake is sufficient so that the brake applying lever 25 tends to oscillate solenoid lever 40 beyond its normal range of operation. Under these conditions, the solenoid gap would become unduly large but for the present invention. The one way clutch of the present invention operates when the projecting terminal 52 at the free end portion of spring 50 engages the fixed stop 53 in a direction such as to unwind the clutch spring from the then driving rotor 47 to allow such rotor to continue independent movement under bias of spring 27 until the proper relationship is re-established. As long as such proper relationship continues, the free end of the spring will not again strike the stop.

The second condition under which automatic adjustment occurs is the situation in which the lever 40 strikes the abutment 58 and is abruptly brought to rest. This movement of lever 40 is accomplished through the two rotors acting under bias transmitted through the brake applying lever 25 from spring 27. It occurs when the brake is applied following de-energization of the solenoid. The shock reaction is found to result in a momentary relaxation of the wind of clutch spring 50 about rotor 47. During the brief interval when the clutch spring pressure is relaxed, the rotor 47 will readjust itself to appropriate angular relationship to rotor 45 and this will occur in either direction of relative angular movement. In other words, whether the brake disks are worn or whether they are swollen, the self-adjustment which occurs following impact of the solenoid lever with its stop abutment operates, in effect, to provide a datum relationship between the two rotors which is renewed following every operation of the solenoid. This mode of operation is ordinarily sufficient for all self-adjusting purposes, engagement of the terminal free end portion 52 of spring 50 by stop 53 serving as a supplemental means of assuring automatic operation.

The various modifications embodied in FIG. 8 are not interrelated in the sense that all must be used together. One modification simply shows the application of the inventions to a clutch as distinguished from a brake; another discloses a different way of applying thrust to the plates; still another suggests the use of a manual control rather than a solenoid actuator.

The motor armature shaft 190 has a driven pulley 70 mounted upon it and provided with splines at 120 for the floating clutch disk 130. The driving clutch disks 170 and 171 are keyed to the armature shaft at opposite sides of the driven disk 130 splined to the pulley. The clutch is engaged by axial pressure transmitted to the clutch disk 171 through the thrust bearing 71 from the pressure plate 150. The arm 250 is closely similar to the arm 25 shown in FIG. 1 having a fixed pivot at 260. A pin at 72 loosely engages the arm 250 to preclude the rotation of the pressure transmitting plate 150. The clutch applying spring 27 is like that shown in FIG. 1. The segment 56 carried by lever arm 250 for engagement with gear 55 is identical with the arrangement already described.

In this construction, the lever 400 is operated by handle 74 instead of being connected to a solenoid armature. Its upper position is defined by engagement of the lever 400 with adjustable stop 580. The hand lever 400 is urged to one or the other of the extreme positions shown in full and dotted lines in FIG. 8, a preferred arrangement to this end comprising the provision of a wedge-shaped cam member 75 on the handle engaging a roller 76 biased outwardly by compression spring 77. When the roller is engaged beneath the wedge, the handle 400 is urged upwardly; when the roller is engaged above the wedge, the handle is urged downwardly. The clutch spring 50 as used in the device is unchanged from that shown in FIGS. 1 and 4, the outwardly bent free end portion 52 of the spring being normally engaged with the fixed stop 53, exactly as previously described.

This manually operated clutch may be engaged and disengaged at will to drive the pulleys 70 and belts 73 from the armature shaft 190, or to release the clutch and allow the pulleys and belts to remain at rest. Any wear will automatically be compensated in the manner above described due to the fact that the clutch will be momentarily disengaged either by momentum of the clutch operator when the handle strikes its stop or by overrun of the clutch spring beyond its normal range in the event of wear occurring during continuous operation. In either case, temporary disengagement of the overrunning control clutch permits the parts to assume new positions in which the clutch will be re-engaged in the same manner as the brake disks are re-engaged in the structure first described.

While FIG. 8 is assumed to have the type of clutch disclosed in connection with FIGS. 1 to 7, FIGS. 9 to 12 demonstrate that a different type of overrunning clutch may also be employed.

In FIGS. 9 to 12, inclusive, the lever 401 may be solenoid-actuated or manually-actuated as taught in FIGS. 1 and 8, respectively. By way of example, it is illustrated as being provided with an operating link 39 for solenoid actuation. The hub portion 80 of lever 401 is free to rotate on the bar 48 already described, and which also supports for rotation the gear 55.

Connected with the hub of gear 55 is the outer race 81 of the overrunning clutch of the present device, the inner race being provided by the hub 80 of lever 401, as already described. Between the inner and outer races 80 and 81 is a bearing cage sleeve 83 connected with a supplemental lever 84 lying against one side of the lever 401 and pivoted on the portion 85 of hub 80. A pin 86 projects laterally from the supplemental lever 84, being accommodated in the notch 87 in lever 401. A tension spring 88 having an anchorage at 89 to the lever 401 is connected to the pin 86 to bias such pin toward its limited movement at the upper end of slot 87 as shown in FIGS. 10 and 11.

Positioned by the cage 83 between the races 80 and 81 of the overrunning clutch are the clutch rollers 90. The inner race 80, this being the hub of lever 401, has cam flats 93 on which the several rollers 90 are engaged. These flats are disposed on minor chords of the otherwise cylindrical inner race 80. In the position of the parts shown in FIG. 10, the cage 83 has forced the rollers 90 outwardly along the cam surfaces provided by the flats 93 to positions in which the rollers are tightly wedged between the inner and outer races. This movement of the parts is occasioned by the bias of spring 88 transmitted to supplemental lever 84 and thence to the cage connected with such supplemental lever.

In the position of the parts shown in FIG. 11, the lever 401 and supplemental lever 84 have both moved upwardly as viewed in these drawings (clockwise around the axis of bar 48) until the pin 94 projecting from the supplemental lever 84 has just approached the fixed stop 95. It will be observed that as yet there has been no relative movement between the lever 401 and supplemental lever 84, the pin 86 still being tight against the upper end of the slot 87.

However continued upward movement of the lever 401 will necessarily occur independently of the supplemental lever 84 by reason of engagement of pin 94 with stop 95 which precludes the continued movement of the supplemental lever. This results in relative clockwise rotation of the inner race 80 with respect to the now-fixed inner cage 83, thereby freeing the rollers 90 from wedged engagement between the races, as shown in FIG. 12. The release of wedging interaction completely disengages the clutch or brake plates from the control, allowing these to find new positions from which they will be movable through the desired range of operation when the overrunning clutch re-engages.

It will be understood that the release of the clutch may result from overrun due to continued movement of the gear 55 and lever 250 after the operating lever 401, or its connections, encounters a fixed stop like that shown at 58 in FIG. 7 or that shown at 580 in FIG. 8. However, the purpose of including FIGS. 10 to 12, inclusive, is to show how the device may become self-adjusting any time the parts exceed their normal intended range of operation, even though no engaging or disengaging movement of the control lever may have occurred in the interim. In other words, the device is self-compensating for wear which occurs during continued operation, as well as being self-compensating on the occasion of abrupt movement to a fixed stop.

I claim:
1. A self-adjusting connection for a part subject to variable displacement in the event of wear, said connection including an over-running clutch having relatively movable elements, one of which has motion transmitting connections to said part and a contractile helical spring having windings encircling said elements, and fixed stop means for relaxing the contractile grip of said spring upon one of said elements when this spring exceeds a predetermined range of movement with said elements.

2. A self-adjusting driving connection comprising a driven element and a driving element normally movable in unison through a predetermined range, an overrunning clutch providing a driving connection between said elements and means for automatically adjusting the relative position of said elements whenever said range is exceeded and regardless of the direction in which the range is exceeded, said last means comprising spaced fixed stop means at both extremes of the range for disengaging said clutch to release said connection temporarily.

3. A self-adjusting driving connection comprising a driven element and a driving element, means for the coaxial mounting of said elements for oscillation, an overrunning clutch normally engaged and constituting means providing a driving connection between said elements effective throughout a predetermined range of oscillation, means for disengaging said clutch positively when said range of oscillation is exceeded in one direction and a stop limiting the oscillation of one of said elements in the other direction, the said overrunning clutch providing means for accommodating momentum-induced overrun of the other element when said last mentioned stop is encountered, such overrun being a means of self-adjustment between said elements in addition to a self-adjustment thereof consequent upon the movement of said elements beyond said range.

4. A self-adjusting driving connection comprising substantially coaxial rotors having means supporting them for rotation, a clutch spring connected with one of said rotors and contractilely engaged with the other to provide a driving connection between said rotors, said clutch spring having a free end portion projecting radially from the rotor with which the clutch spring is contractilely engaged, and means providing a fixed stop in the path of oscillation of the free end portion of the clutch spring for relaxing the contractile engagement of the clutch spring with said other rotor, the rotors being free for oscillation throughout a range in which they are connected by the clutch spring and being automatically de-clutched when oscillation exceeds said range in a predetermined direction of rotor oscillation.

5. The combination with an operator having a predetermined range of movement and means for actuating it and means for supporting it for such movement, of a driven part with which said operator is coupled and which is movable through a variable range, of a driving connection between the operator and said driven part which is self-adjusting to accommodate the range of movement of the part to the range of movement of said operator, said driving connection comprising a pair of substantially coaxial rotors, one of which is connected with the operator and the other with said part, a clutch spring wound upon the rotors and connected at one end with one of the rotors and having a contractile frictional engagement adjacent its other end with said other rotor, the said other end of the spring having a projecting terminal, and a stop means disposed in the path of oscillation of the projecting terminal in one direction of oscillation of said rotors and at a point such as to be engaged by said terminal when predetermined variation in the range of operation of the operator is such as to exceed in one direction the range of operation of the driven part as coupled through said spring.

6. The combination with an operating member having predetermined normal range of movement and means for actuating it and means for supporting it for such movement, of an operated member having predetermined normal range of movement and means supporting it for such movement, a stop defining a limit of the range of movement of one of said members, a pair of substantially coaxial rotors having operative motion transmitting connection with said members, and a clutch spring having wind in contractile engagement with the rotors and serving to transmit motion from the operating member to the operated member, said spring being wound upon said rotors in a direction such that sharp contact with said stop of the member whose range of movement is defined by the stop will relax the wind of said spring to release the clutching action thereof sufficiently to permit relative movement between said rotors, a datum position of relative adjustment of the rotors being thereby defined with each contact of said last mentioned member with said stop.

7. The combination with a device comprising relatively movable parts subject to wear, the wear varying the range of relative movement required between said parts, of an operated member connected with one of said parts for the actuation thereof through said range, means mounting the operated member for oscillation through a range corresponding to that of the part with which it is connected and subject to similar variation in relative angular position consequent upon the wear between said parts, a spring biasing said operated member in one direction, an operating member coaxial with the operated member and having means for its power actuation and means for supporting it for oscillation and means for limiting its range of movement, a coupling connection between the operating member and the operated member for transmitting movement of the operating member within its said range to effect movement of the operated member in its said range, said coupling connections including means for effecting self-adjustment to conform to variation in the range of the operated member to bring about a predetermined movement of such operated member which is of substantially uniform extent notwithstanding variation in range, and means for rendering said self-adjustment means effective whenever said range is exceeded in either direction, the means for rendering the self-adjustment means effective including the aforesaid means for limiting the range of movement of the operating member.

8. In a device of the character described, the combination with relatively rotatable plates axially movable to and from engagement and subject to wear which varies the range in which axial movement of engagement and disengagement of said plates occurs, of means for transmitting motion to one of said plates to effect a given relative displacement thereof notwithstanding such variation in range, said means comprising a member in motion transmitting relation to said one plate, a driving member, coaxial rotors respectively connected with said members, a coupling spring contractilely wound on said rotors and having a fixed connection with one of them and a free end portion encircling the other, said spring constituting a clutch for the transmission of motion from the driving member to the first mentioned member in a range of rotor movement determined by the range in which the driving member is operable, and means whereby the wind of said spring about the rotor engaged by the free end portion of the spring is relaxed whenever the range of the first mentioned member ceases to conform with the range of the driving member.

9. The device of claim 8 in which the said plates comprise brake and shaft plates and the first mentioned member comprises a brake applying lever having spring bias in a direction to engage such plates, the driving member comprising a lever having electromagnetic means for actuating it in opposition to said bias.

10. The device of claim 9 in which the operating member has direct connection with one of said rotors, the brake applying lever having a gear segment and the other of said rotors having a pinion engaged with said segment.

11. In an armature shaft brake for an electric motor which comprises a shaft disk connected with the shaft and a braking disk fixed against rotation and movable axially of the shaft to and from engagement with the disk first mentioned and provided with a lever for moving the braking disk toward engagement with the shaft disk, of brake releasing means including a self-adjusting connection, said releasing means comprising a pair of coaxial rotors, one of which is connected with said lever, a coupling between said rotors comprising a clutch spring wound upon said rotors and having a free end encircling said one rotor and a fixed end connected with the other rotor, and power means for the actuation of said other rotor in a direction to transmit motion through said spring to said one rotor for the actuation of said lever in a direction to release said plate.

12. The device of claim 11 in which said one rotor is provided with a pinion, said lever having a gear segment connected with it and meshing with the pinion.

13. The device of claim 11 in which the first lever has means biasing it in a direction to engage said plates and the power means for actuating said other rotor comprises a second lever having electromagnetic means for operating it in one direction against the bias of the first mentioned lever and having a stop limiting its return movement in the other direction subject to the bias of the first mentioned lever.

References Cited in the file of this patent

UNITED STATES PATENTS

| | | |
|---|---|---|
| 1,908,435 | McConkey | May 9, 1933 |
| 2,421,869 | Brock | June 10, 1947 |
| 2,702,101 | Dewhurst | Feb. 15, 1955 |